US011295628B2

(12) United States Patent
Bortolon

(10) Patent No.: US 11,295,628 B2
(45) Date of Patent: Apr. 5, 2022

(54) MOTION SIMULATION SYSTEM

(71) Applicant: CRESNO SA, Roveredo (CH)

(72) Inventor: Riccardo Bortolon, Roveredo (CH)

(73) Assignee: CRESNO SA, Roveredo (CH)

( * ) Notice: Subject to any disclaimer, the term of this patent is extended or adjusted under 35 U.S.C. 154(b) by 422 days.

(21) Appl. No.: 16/344,382

(22) PCT Filed: Oct. 17, 2017

(86) PCT No.: PCT/IB2017/056423
§ 371 (c)(1),
(2) Date: Apr. 24, 2019

(87) PCT Pub. No.: WO2018/078485
PCT Pub. Date: May 3, 2018

(65) Prior Publication Data
US 2019/0259295 A1 Aug. 22, 2019

(30) Foreign Application Priority Data
Oct. 24, 2016 (IT) .................. 102016000106809

(51) Int. Cl.
G09B 9/02 (2006.01)
G09B 9/04 (2006.01)
G09B 9/058 (2006.01)

(52) U.S. Cl.
CPC ................ G09B 9/02 (2013.01); G09B 9/04 (2013.01); G09B 9/058 (2013.01)

(58) Field of Classification Search
CPC ............ G09B 9/02; G09B 9/04; G09B 9/058
See application file for complete search history.

(56) References Cited

U.S. PATENT DOCUMENTS 8,356,996 B2 * 1/2013 Mayrhofer ............... G09B 9/02
434/55
8,565,670 B2 10/2013 Antikidis
(Continued)

FOREIGN PATENT DOCUMENTS

FR 3024931 A1 2/2016
WO 2008/081406 A1 7/2008
(Continued)

OTHER PUBLICATIONS

Teo et al., "Distributed Geo-rectification of Satellite Images using Grid Computing", Parallel and Distributed Processing Symposium, 2003, XP010645301.
(Continued)

Primary Examiner — Eddy Saint-Vil
(74) Attorney, Agent, or Firm — Nixon & Vanderhye

(57) ABSTRACT

A motion simulation system includes at least five superimposed planes, the planes sequentially being from the bottom upwards: a first plane in turn including a first rotational plate; a second plane in turn including a second rotational plate; a third plane including a track-like structure for the sliding of an overlying slidable base; a fourth plane in turn including the slidable base, a fourth rotational plate integrally joined beneath the slidable base; a fifth plane including at least one cockpit adapted to enable the access of the user of the motion simulation system, the system allowing the continuous reproduction of the forces associated with the lateral accelerations that are developed when negotiating curves and trajectories typical of Formula 1 racetracks and of motorcycle competition racetracks.

20 Claims, 2 Drawing Sheets

(56) References Cited

U.S. PATENT DOCUMENTS

| | | | |
|---|---|---|---|
| 9,764,466 B2 | 9/2017 | Rey et al. | |
| 10,403,164 B2 * | 9/2019 | Tischer | G09B 9/04 |
| 10,650,695 B2 * | 5/2020 | Minen | G09B 9/04 |
| 2010/0216097 A1 | 8/2010 | Romagnoli et al. | |
| 2017/0263161 A1 | 9/2017 | Antikidis | |

FOREIGN PATENT DOCUMENTS

| | | |
|---|---|---|
| WO | 2010/037939 A1 | 4/2010 |
| WO | 2014/076079 A1 | 5/2014 |

OTHER PUBLICATIONS

International Search Report and Written Opinion, dated Jan. 2, 2018, from corresponding PCT application No. PCT/IB2017/056423.

* cited by examiner

MOTION SIMULATION SYSTEM

FIELD OF THE ART

The present invention refers to the mechanical field. More in detail the present invention regards the field of motion simulation systems and in particular, but not exclusively, reference is made to an automobile simulation system.

STATE OF THE ART

In recent decades, automated apparatuses have had particular success and diffusion which are suitable for enabling the simulation of activities such as professionally driving cars and flying airplanes. These systems, initially conceived for training in the aerospace and then aeronautical fields, have found immediate application in entertainment and edutainment fields and simultaneously have been widely innovated and improved to the point that they have become indispensable for the training of pilots/drivers who perform the aforesaid activities, in competitions and professionally.

In the case of flight simulators, these are systems which aim to simulate the airplane-flying experience as close to the reality as possible. The various types of simulators therefore vary from videogames to real-time reproductions, on actual scale, of true cockpits, in which the airplanes are mounted on electromechanical or hydraulic actuators entirely managed by computer. This simulator type has wide use in the aeronautics and military industry for training pilots for many different situations, and in particular in emergency or disaster situations.

All this in order to consistently innovate aeronautical development and reduce the costs and risks deriving from the training activity.

In the automobile field, over the last few years sophisticated simulation systems have been developed, to the point that they are used by famous car manufacturers for training drivers of Formula 1, NASCAR, IndyCar circuits, and other important motorcycle competitions. There are for example innovative Formula 1 driving simulation platforms in which the user has the possibility to "drive" inside a track reproduced in 3D and projected on screens. The platform is capable of being moved in a manner such to give the perception that the single-seater is adapted to the precise point of the track.

In addition, due to the presence of stepper motors placed on the rear part and at least one motor placed on the front part of the single-seater, the user has the possibility to experience rolling, pitching and yawing simultaneously with the visual emotional experiences. More in detail, these platforms comprise a frame represented by a base lying on a floating floor; a bodywork receiving the stepper translation motors, a system of audio amplification for the reproduction of the vibrations, a continuity group, the driving system such as a steering wheel or the like, the motors for the feedback of the driving system, pedals for accelerator and brake; an electrical, electronic and display part adapted for managing the various components.

The mechanical part receiving the stepper motors, for the mechanical movement, provides that such motors are covered by a protective casing.

In the aeronautical field, the state of the art of simulation in the field of the present invention is represented by a so-called "hexapod" system consisting of a platform to which six piston-like actuators are connected. The system is controlled by a specific software which allows converting the coordinates assigned in a virtual Cartesian axis system into single-actuator position controls, controlled by a controller. There are multiple application fields for this high-technology simulation system: for example, the document WO2014076079 describes a robot having the characteristics of the aforesaid hexapod system to be used, by way of a non-limiting example, for repairing nuclear reactors. More in detail, the abovementioned document describes a hexapod system for a robot comprising a first and a second support and six linear actuators having two ends.

Each end is connected to the respective supports by means of rotatable connection means. As mentioned multiple times above, this type of simulation systems is used in many different applications fields, in particular such systems are adapted for simulating car and airplane motion experiences not only in conventional situations but also in so-called extreme and dangerous situations.

In many cases, the need to arrange innovative simulators, such to allow the simulation of the motion experience to be as close as possible to reality, is not just for its own sake—for defining a high-technology apparatus capable of accurately reproducing the movements of a car when racing or an airplane during landing—but rather arises from the important—necessity to allow users of such systems to be able to conduct training exercises aimed for training pilots/drivers in the aforesaid airplane flying or car driving conditions without causing kinetosis effects thereto. The latter phenomenon arises in situations of sharp and sudden changes of direction, or in situations where the sensations expected by the human body do not coincide with the actual visual situations, or in situations of prolonged training where the aforesaid situations are present.

The capacity to accurately reproduce the very different conditions which the pilot/driver can encounter when driving/flying such vehicles is therefore of great importance, decisive for the effectiveness of the simulator as trainer.

One of the most important parameters today in evaluating the accurate reproducibility of the motion experiences offered by a simulator is the so-called "lateral G". Such parameter is particularly important in the case of car driving, in the case of flying military fighter planes and in all those cases where the human body is subjected to sudden and intense direction changes.

More specifically, this is a quantity which indicates the centripetal lateral acceleration generated by the static friction of the tires, proportional to the load factor, towards the center of the curve.

In general, sports cars can reach, for brief time periods, lateral G values comprised between 1 and 1.5 G while race cars can reach values of over 5 lateral G.

For such purpose, the object of the present invention described in detail hereinbelow is to propose a particular simulator comprising structural characteristics deriving from the equally particular arrangement of its components which allows reproducing, by way of a non-limiting example, the motion experiences corresponding to the accurate perception of the forces which are developed by the lateral accelerations encounterable in Formula 1. All of this without generating on users the kinetosis effects typical of current mobile platforms, useful for providing a visual feedback but which violate the kinematic motion expectations.

Description of the Invention

The present description refers to a particular simulation system adapted to accurately reproduce the mechanical stresses, as well as the emotional perceptions, sustained by a human body during the motion of a transport vehicle. More in detail, the present description refers to a motion simulation system capable of generating the lateral "G" accelerations that are manifested when negotiating a curve.

Still more in detail, the present invention refers to a simulation system capable of simulating said lateral quantities in very different curve-negotiating situations, different both in terms of duration and intensity.

Said system also allows reversing in real time the forces at play, required by the simulation. More specifically the present simulation system allows reproducing the forces that occur from the lateral accelerations of the curve negotiation, due to a particular arrangement of its structural components.

Still more specifically, said system comprises planes provided with independent rotary movement, interrupted by a plane to which also movement of translational type is associable. The movement planes work in a synchronized manner according to that established by the numerical control means.

The simulation system according to the present invention is such that its mechanical structure, and the intensity and amplitude of the translational and rotational horizontal movement of its components, allow eliminating the latency between expected movement and that perceived by the user.

In addition, the present system, due to the distribution of specific functions assigned to the various planes, is capable of generating very quickly and precisely the set of forces associated with the lateral accelerations that must be reproduced, fully meeting the increased emotional expectations of the user.

More specifically the present simulation system substantially comprises at least four superimposed and non-coaxial planes which have a specific spatial configuration, described in detail hereinbelow, adapted to allow the obtainment of all the advantages offered by the present invention.

The first plane comprises a circular rotational plate which has the function of generating the forces associated with the lateral accelerations as a function of the position of the body of the user, and it works in the horizontal plane.

The second plane, arranged on said first plane, comprises a circular rotational plate whose center is arranged on said first plane in a non-coaxial manner. Preferably it is arranged in a manner such that its center is situated at three-quarters of the radius associated with said first plane, starting from the center of the first plate. The second plane, associated with the fourth plane, has the function of positioning the body of the user in a position lateral to the rotation direction of the plane 1 and it too works in the horizontal plane.

The third plane comprises a plate for linear positioning arranged in a centered manner on said second plane.

The third plane has the function of generating the forces associated with the accelerations and with the braking and it too works in the horizontal plane. Said third plane comprises a track-like structure for the sliding of an overlying slidable base.

The fourth plane, arranged on said third plane, comprises a rotational plate and a slidable base which linearly slides on said track-like structure which is comprised in said third plane. The fourth plane has the function of generating the forces, associated with the lateral accelerations, deriving from sharp and sudden changes of direction and/or from the loss of adherence of the front or rear wheels.

Also said fourth plane works in the horizontal plane.

It should also be indicated that the second plane and the fourth plane are necessary for correctly positioning, in the necessary times, the body subjected to lateral acceleration. The system also comprises: a fifth plane comprising a column lifting system, by way of a non-limiting example actuator-like, controlled by a relative simulation software which allows converting the coordinates assigned in a virtual Cartesian axis system into single-actuator position controls. The fifth plane also comprises a cockpit suitable for receiving the user and, preferably but not exclusively, in some of its preferred embodiments it can comprise further cockpits for the control of the motion by third parties. In order to improve comprehension and clarity of the present invention, a detailed description will be provided hereinbelow for the operation of the present system in one of its preferred embodiments.

Figure 1:
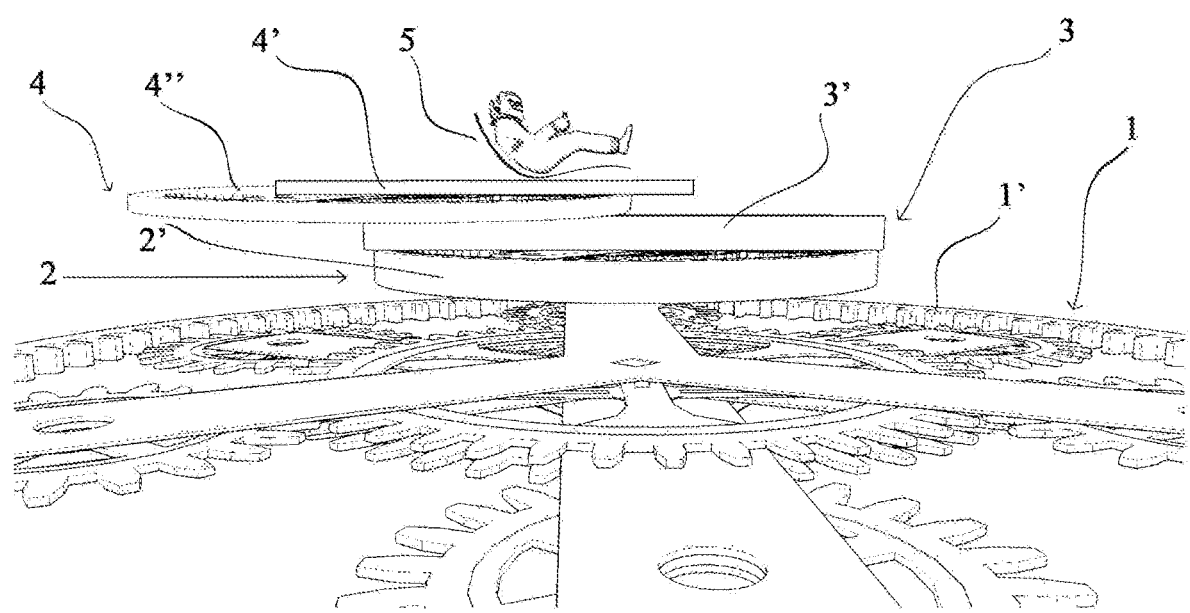
FIG. 1 shows a side view of the motion simulation system according to the present invention in a particular embodiment thereof.

More in detail the figure in question shows that said system comprises five planes and in particular a first plane 1, a second plane 2, a third plane 3, a fourth plane 4 and a fifth plane 5. In particular said first plane 1, second plane 2 and fourth plane 4 comprise rotational plates superimposed in a off-centered manner, which are spatially configured such that the rotary movement of each rotational plate with respect to the axis thereof generates the forces associated with the lateral accelerations that the driver must perceive, such that the system is capable of simulating the driving experiences of negotiating curves such as those characterizing the Formula 1 racetracks.

In the figure in question, four planes shaped as planetary gears are observable in this particular embodiment.

More specifically the first rotational plate 1', the second rotational plate 2', and the fourth rotational plate 4'', respectively comprised in said first plane 1, second plane 2 and fourth plane 4, appear like toothed wheels movable by respective pinions.

The system also underlines the particular spatial configuration of the superimposed planes in a off-centered manner.

More in detail the center of the second rotational plate 2' can be detected at the height of ¾ of the radius associated with said first rotational plate 1' starting from the center of the first rotational plate 1', and the rotational center of the fourth rotational plate 4'' in curved position can be generically detected in a point that can be projected along the circumference of the second rotational plate 2'. The figure also shows that: the structure 3', of the third plane 3, is integrally joined above second rotational plate 2', such structure adapted to allow the sliding of the slidable base 4', the fourth rotational plate 4'' integrally joined beneath such base.

Figure 2:
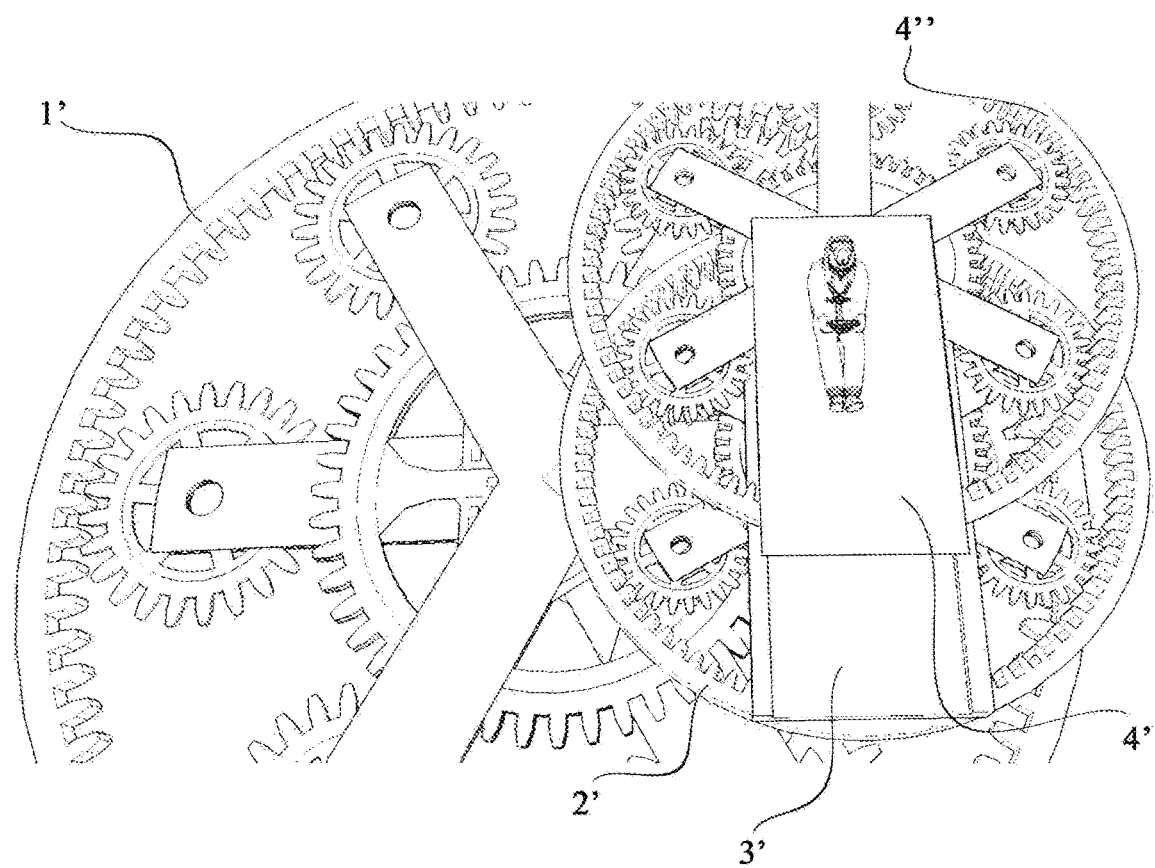

FIG. 2 is a top view of the motion simulation system as described in FIG. 1.

Figure 3:
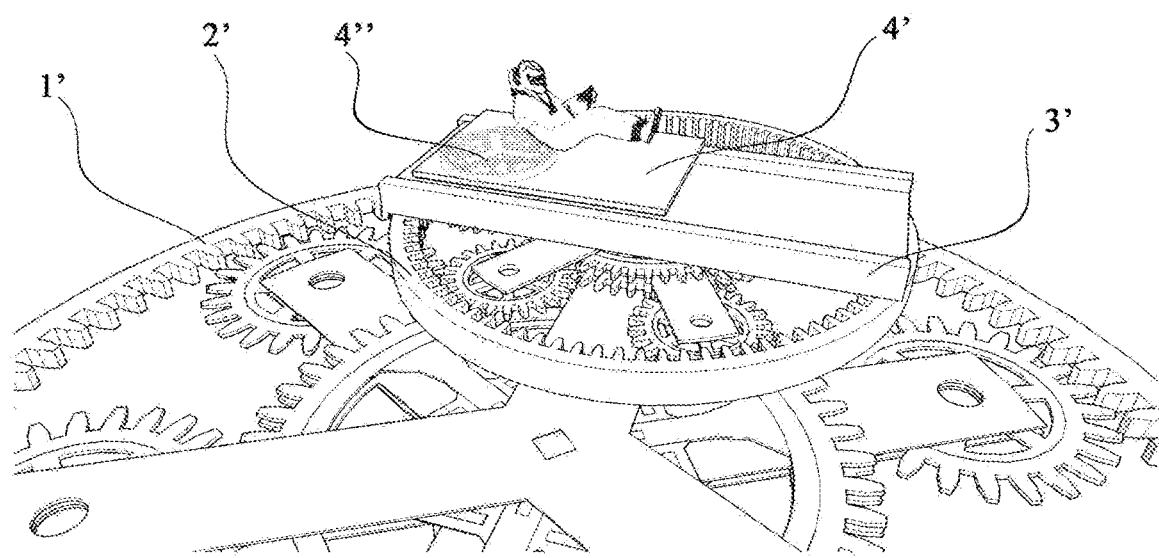

FIG. 3 is a perspective view of the motion simulation system as described in FIG. 1. The figure also shows the case in which the ratio between the diameter of the fourth rotational plate 4'' and that of the second rotational plate 2' is 1:4, different from the case illustrated in the aforesaid figure in which such ratio is 1:1.

Figure 4:
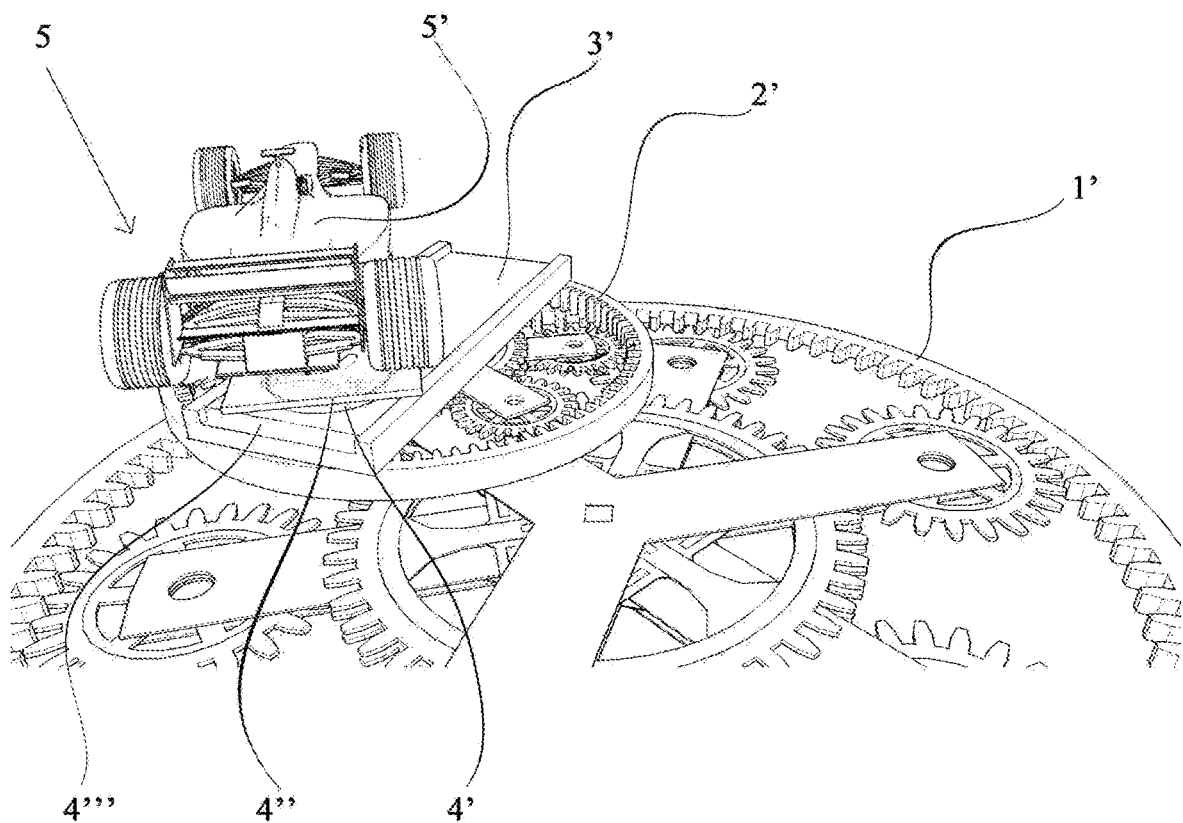

FIG. 4 shows a perspective view of the present simulation system in which the cockpit 5', such as a single-seater, is observable. The figure also shows that said cockpit 5' is placed above the fourth plane 4 comprising the slidable base 4', the fourth rotational plate 4'' integrally joined beneath such base and supported by the support 4''' longitudinally slidable in the structure 3' of the third plane. Such arrangement allows associating a rotational-translational motion to the slidable base 4'.

DESCRIPTION OF THE PREFERRED EMBODIMENTS

The invention will be described hereinbelow with reference to the enclosed figures, and by way of a non-limiting example, in one of its preferred embodiments.

In general, the motion simulation system according to the present invention appears as a structure substantially comprising at least five superimposed planes of which some are superimposed in a off-centered manner and in particular, starting from the bottom to the top: a first plane 1 in turn comprising a first rotational plate 1'; a second plane 2 in turn comprising a second rotational plate 2': a third plane 3 comprising a structure 3' with preferably rectangular profile adapted to act as a track-like base for the support of an overlying plane 4; a fourth plane 4 in turn comprising a slidable base 4' adapted to longitudinally slide along said track-like structure 3', and a fourth rotational plate 4" integrally joined beneath said slidable base 4' and supported by a support 4''' longitudinally slidable in said structure 3'.

Still more in detail, said planes comprised in the present simulation system and in particular said rotational plates present therein are superimposed on each other, in a manner such that their longitudinal axes do not coincide, thus they are non-coaxial structures.

Their sizes, and more specifically their size ratios, and their spatial configurations are decisive for the obtainment of the advantages that the present invention intends to offer the user: in primis the user perceives the forces associated with the lateral accelerations of a vehicle in negotiating curves such as those, by way of a non-limiting example, of Formula 1 racetracks, the elimination of the kinetosis effect and the precision of the movements.

The system also comprises a fifth plane 5 comprising at least one cockpit 5', typically single-seater, above said fourth plane 4.

The operation of the simulation system according to the present invention provides that the user/pilot, seated said cockpit, at the time of entering a curve is situated with back directed towards the circumference of the second rotational plate 2' of the second plane 2 and simultaneously with the back directed towards the rotational center of the first rotational plate 1' of said first plane 1.

In detail, the body of the user/pilot is comprised between the circumference of the rotational plate 2' and its rotational center.

The length of the radius of the fourth rotational plate 4" is determined by the length that the body occupies between the rotational center of the fourth rotational plate 4" and its circumference.

If the intention is that of negotiating a curve towards the right, the steering wheel (or an equivalent steering system present in said cockpit 5') will be moved clockwise and said fourth rotational plate 4" will also rotate in clockwise sense.

The underlying rotational plate 2' comprised in the second plane 2 will also rotate in clockwise sense until it places— acting synergistically with the rotation of said fourth rotational plate 4"—the cockpit 5' of the user/pilot in lateral position tangent to the circumference of the first rotational plate 1'. In this manner the user will be situated with his/her right side directed towards the center of said first rotational plate 1' of the first plane 1, and with his/her left side directed towards the perimeter of said first rotational plate 1'. The latter, simultaneously with the rotation of the overlying rotational plates, will start to rotate in clockwise sense, towards the right, subjecting all the bodies arranged above said fourth rotational plate 4" to the effect of a centrifugal force. The user, also being subjected to such effect, will come to perceive the forces at play during the negotiation of the curve as real.

All this allows simulating the experience of negotiating a curve as closely as possible to reality.

The third plane 3 and the fifth plane 5 are irrelevant for the generation of the lateral forces G but mainly serve to allow front, rear and vertical translational motions of the cockpit, hence indirectly also motions of the user, in order to even only partially simulate the forces deriving from accelerations, braking, collisions, changes of slope or variations of position. Regarding the size aspect, in general the overall system is typically but not necessarily affected by the size of the cockpit 5' comprised in said fifth plane 5; from such size, in a cascade manner, the size of the underlying planes is established.

In general, the first rotational plate 1' has larger diameter than second rotational plate 2' whose center is in a point that can be projected on the radius of the underlying first rotational plate 1', and the second rotational plate 2' has a diameter equal to or larger than fourth rotational plate 4" whose center is in a point that can be projected on the radius of the underlying second rotational plate 2' or along the circumference thereof. In this as in other embodiments, the simulation system according to the present invention provides that the diameters of the first plane 1 and of the second plane 2, and in particular of the rotational plates comprised therein, i.e. that of the first rotational plate 1' and that of the second rotational plate 2', are dependent on the length selected to attribute to the third plane 3 which, in turn, depends on the length of the radius of the fourth rotational plate 4" of the fourth plane 4. Preferably the ratio between the diameter of the first rotational plate 1' and that of the second rotational plate 2' is typically, but not exclusively, 2:1. The diameter of the second rotational plate 2' is typically, but not exclusively, equal to the length of the third plane 3 and in particular of its track-like structure 3' which typically has rectangular shape and is sized to enable the sliding of the overlying slidable base 4'. Thus, said diameter of the second rotational plate 2' is equal to the length of the larger side of the rectangular shape of said track-like structure 3'. The ratio between the diameter of the fourth rotational plate 4" and that of the second rotational plate 2' is typically but not exclusively 1:1.

It should be indicated that said planes of the present simulation system can have varied structure in the various embodiments of said system.

With reference to the enclosed figures, said planes and in particular the first plane 1, the second plane 2 and the fourth plane 4 are structured, in the particular shown embodiment, like gears.

Thus, said planes comprise all the known mechanical components and levers associated with this mechanism type for the transmission of the mechanical moments.

More specifically, this embodiment provides that the first plane 1 comprises a rotational plate 1' structured like a common toothed wheel whose motion is imparted by common pinions, circumscribed by said toothed wheel, similar to what occurs in the known planetary gear systems.

Similarly, also the other rotational plates 2' and 4" are also structured like planetary gear systems and the planes to which they belong therefore comprise all the known components adapted for the kinematic mechanism thereof.

The description of said known components is therefore omitted from the present document, since it taken for granted that the average man skilled in the art understands their presence, or that of equivalent systems, and that the essence of the invention lies in the particular spatial configuration of the at least four planes comprised in the present system and in the operation principle of the latter which—due to the rotation of the rotational plates comprised therein and suitably spatially configured—allows providing the user the perception of an accurate reproduction of the forces associated with the lateral accelerations that are developed when negotiating curves, such as those which characterize Formula 1 racetracks.

At any rate it should be indicated that the present motion transmission system can make use of electric motors and gear motors, a number thereof present that varies in accordance with the overall size of the system and of the performance that one wishes to attain. Further embodiments according to the present invention provide that the present simulation system makes use of magnetic suspension and propulsion systems typical of the "Maglev" magnetic levitation systems.

In this case, the planes comprising said rotational plates will maintain the operation principle of the simulation system according to the present invention in an analogous manner; as repeated several times above, such principle aims to reproduce the forces developed by the lateral accelerations in curves like those by way of a non-limiting example characterizing Formula 1 racetracks.

In the latter as in other embodiments, the at least four planes of the system and in particular the first plane 1 and the second plane 2, the third plane 3 and the fourth plane 4 can be spaced by interfaced permanent magnets, with opposite sign, in order to reduce the friction between the rotating parts.

In addition to the particular spatial configuration of the planes of the system, a further essential characteristic according to the present invention is represented by the fact that the rotational plates comprised therein, i.e. the first rotational plate 1', the second rotational plate 2' and the fourth rotational plate 4", can rotate around the axis thereof both in clockwise and counter-clockwise sense and in a continuous manner without end stop at 360°.

Independent of the structural variants that can be encountered in the various embodiments, the unitarity detectable in the system according to the present invention lies in its principle of operation as well as in the method using it.

Said method, which makes us of the present system, in fact allows enabling the user of the simulation system to perceive the forces relative to the lateral accelerations of a vehicle on a curve. Said method therefore consists of exploiting at least five planes like those described above so as to obtain the desired effect.

More in detail, said method provides that of the at least five planes, and more specifically of the rotational plates present therein, the fourth rotational plate 4" underlying the fifth plane 5 comprising the lifting system and the cockpit 5' of the user allows the latter to control the steering and the direction, clockwise or counter-clockwise, of "entering" a curve by acting on a steering system such as a handlebar, a joystick, a rudder, a steering wheel, a gearshift or the like; said second rotational plate 2' underlying and supporting the structure 3' adapted to enable the sliding of the slidable base 4'—said fourth rotational plate 4" integrally joined beneath such base (on which the fifth plane 5 is arranged)—allows, by rotating around axis thereof, subjecting to centrifugal action everything place above said second rotational plate 2', including the user.

The first rotational plate 1' being beneath said rotational plates, having a larger diameter than these, and supporting the overlying planes, allows—by rotating around the axis thereof—subjecting everything to the main centrifugal force, boosting and thus completing the centrifugal action of the rotation of the second and the fourth rotational plate 2' and 4" and acting in every respect like a maxi-centrifuge.

All this allows the user to perceive a reproduction as close as possible to the reality of the forces associated with the lateral accelerations typical of the curves of the Formula 1 racetracks.

As mentioned during the course of the present description, the system can be automated and managed with a software suitable to transmit specific electrical signals that can be translated into particular motion experiences.

The transmission of said electrical signals can occur in wireless mode or by means of common wired mode.

The transmission of the electric current for the motorization can occur via wire or by means of magnetic induction.

As in the already-known motion simulation systems like those pertaining to the present invention, the system comprises, typically in the cockpit where there is the user access, at least one from among the vehicle steering systems such as a steering wheel, a handlebar, a rudder, a gearshift, a joystick and the like, from which the signal is transferred to the rotational plates, as well as the direction to be employed and the relative acceleration.

In all the embodiments thereof, the components of the motion simulation system according to the present invention can be made of polymeric and/or metallic and/or composite materials.

It is also of specific interest to indicate that in all embodiments thereof, the present simulation system can comprise—in the fifth plane 5 and as already mentioned above—not just the cockpit 5' but also a lifting system for simulating motion associated with changes of slope.

Said lifting system is, by way of a non-limiting example, represented by a system comprising actuator-like columns.

The software associated with the present simulation system allows converting the coordinates in a system of virtual Cartesian axes into position controls for the single actuator-like columns.

Said columns are moved under the control of said simulation software which manages the spatial slopes that said lifting system, comprised in the fifth plane 5, must reproduce.

As stated above, said lifting system is comprised in said plane 5 and is irrelevant for the generation of the forces associated with the lateral accelerations, which is instead, specifically, the main object the present invention.

The invention claimed is:
1. A motion simulation system comprising:
 at least five superimposed planes, said at least five superimposed planes being in sequence from a bottom upwards:
 a first plane (1) comprising a first rotational plate (1'),
 a second plane (2) comprising a second rotational plate (2'),
 a third plane (3) comprising a track-like structure (3') for sliding of an overlying slidable base (4'),
 a fourth plane (4) comprising said slidable base (4'),
 a third rotational plate (4") integrally joined beneath said slidable base (4'), a support (4''') supporting said third rotational plate (4") and slidable in said track-like structure (3'), and at least one fifth plane (5) comprising at least one cockpit (5'), wherein said rotational plates are superimposed in an off-centered manner, wherein said first, second, and third rotational plates are non-coaxial with a rotational axis, said first rotational plate (1') having a larger diameter than said second rotational plate (2'), said second rotational plate (2') having a diameter equal to or larger than said third rotational plate (4"), wherein a center of said second rotational plate (2') is a point located over a radius of the underlying first rotational plate (1'), wherein a center of said third rotational rotational plate (4") is a point located over a radius of the underlying rotational plate (2') or over the circumference of the underlying rotational plate (2'), said track-like structure (3') being integrally joined above said second rotational plate (2') and being sized to enable the sliding of the overlying slidable base (4'), each of said first rotational plate (1'), second rotational plate (2'), and third rotational plate (4") being rotatable by 360° around the rotational axis both clockwise and counter-clockwise, wherein, in use, said motion simulation system subjecting a user in the at least one cockpit (5') to forces associated with lateral accelerations that occur when negotiating curves.

2. The motion simulation system according to claim 1 wherein, a ratio between the diameter of the first rotational plate (1') and the diameter of the second rotational plate (2') is 2:1, the diameter of the second rotational plate (2') is equal to a length of the track-like structure (3'), the track-like structure (3') being rectangular-shaped, and a ratio between the diameter of the third rotational plate (4") and the diameter of the second rotational plate (2') is 1:1.

3. The motion simulation system according to claim 2, wherein the point that is the center of the second rotational plate (2') is located at ¾ of the radius associated with said first rotational plate (1') starting from the center of the first rotational plate (1'), and the point that is the center of the third rotational plate (4") is over the circumference of the underlying said second rotational plate (2').

4. The motion simulation system according to claim 2, wherein each of the first, second and third rotational plates is structured as a planetary gear, the first rotational plate (1'), the second rotational plate (2') and the third rotational plate (4") being structured as movable crown gears with respective pinions.

5. The motion simulation system according to claim 2, further comprising magnetic levitation suspension and magnetic levitation propulsion systems.

6. The motion simulation system according to claim 2, further comprising, inside the at least one cockpit (5'), at least one vehicle steering system selected from among a steering wheel, a handlebar, a rudder, a gearshift, and a joystick.

7. The motion simulation system according to claim 1, wherein the point that is the center of the second rotational plate (2') is located at ¾ of the radius associated with said first rotational plate (1') starting from the center of the first rotational plate (1'), and the point that is the center of the third rotational plate (4") is over the circumference of the underlying said second rotational plate (2').

8. The motion simulation system according to claim 7, wherein each of the first, second and third rotational plates is structured as a planetary gear, the first rotational plate (1'), the second rotational plate (2') and the third rotational plate (4") being structured as movable crown gears with respective pinions.

9. The motion simulation system according to claim 7, further comprising magnetic levitation suspension and magnetic levitation propulsion systems.

10. The motion simulation system according to claim 7, further comprising, inside the at least one cockpit (5'), at least one vehicle steering system selected from among a steering wheel, a handlebar, a rudder, a gearshift, and a joystick.

11. The motion simulation system according to claim 1, wherein each of the first, second and third rotational plates is structured as a planetary gear, the first rotational plate (1'), the second rotational plate (2') and the third rotational plate (4") being structured as movable crown gears with respective pinions.

12. The motion simulation system according to claim 11, further comprising magnetic levitation suspension and magnetic levitation propulsion systems.

13. The motion simulation system according to claim 1, further comprising magnetic levitation suspension and magnetic levitation propulsion systems.

14. The motion simulation system according to claim 1, further comprising, inside the at least one cockpit (5'), at least one vehicle steering system selected from among a steering wheel, a handlebar, a rudder, a gearshift, and a joystick.

15. The motion simulation system according to claim 1, wherein the motion simulation system is made of polymeric and/or metallic and/or composite materials.

16. The motion simulation system according to claim 1, further comprising a software unit configured to transmit electrical signals translatable into motion experiences, said transmission of said electrical signals occurring in wireless or wired mode.

17. The motion simulation system according to claim 16, further comprising transmission systems, electric motors and gear motors.

18. The motion simulation system according to claim 1, further comprising a lifting system for simulating motion associated with changes of slope, said lifting system comprising actuator-like columns and being comprised in the at least one fifth plane (5).

19. A method for enabling the user of the at least one cockpit to perceive the forces related to lateral accelerations a driver is subjected to when negotiating curves of Formula 1 racetracks, comprising:

providing a motion simulation system comprised of at least five superimposed planes, said at least five superimposed planes being in sequence from a bottom upwards:

a first plane (1) comprising a first rotational plate (1'), a second plane (2) comprising a second rotational plate (2'), a third plane (3) comprising a track-like structure (3') for sliding of an overlying slidable base (4'), a fourth plane (4) comprising said slidable base (4'), a third rotational plate (4") integrally joined beneath said slidable base (4'), a support (4''') supporting said third rotational plate (4") and slidable in said track-like structure (3'), and at least one fifth plane (5) comprising at least one cockpit (5'), wherein said rotational plates are superimposed in an off-centered manner, wherein said first, second, and third rotational plates are non-coaxial with a rotational axis, said first rotational plate (1') having a larger diameter than said second rotational plate (2'), said second rotational plate (2') having a diameter equal to or larger than said third rotational plate (4"), wherein a center of said second rotational plate (2') is a point located over a radius of the underlying first rotational plate (1'), wherein a center of said third rotational rotational plate (4") is a point located over a radius of the underlying rotational plate (2') or over the circumference of the underlying rotational plate (2'), said track-like structure (3') being integrally joined above said second rotational plate (2') and being sized to enable the sliding of the overlying slidable base (4'), each of said first rotational plate (1'), second rotational plate (2'), and third rotational plate (4") being rotatable by 360° around the rotational axis both clockwise and counter-clockwise, wherein, in use, said motion simulation system subjecting a user in the at least one cockpit (5') to forces associated with lateral accelerations that occur when negotiating curves; and employing said motion simulation system to simulate the forces related to the lateral accelerations.

20. A method for simulating the forces related to lateral accelerations of vehicles negotiating curves on Formula 1 racetracks using a motion simulation system comprised of at least five superimposed planes, said at least five superimposed planes being in sequence from a bottom upwards:

a first plane (1) comprising a first rotational plate (1'), a second plane (2) comprising a second rotational plate (2'), a third plane (3) comprising a track-like structure (3') for sliding of an overlying slidable base (4'), a fourth plane (4) comprising said slidable base (4'), a third rotational plate (4") integrally joined beneath said slidable base (4'), a support (4''') supporting said third rotational plate (4") and slidable in said track-like structure (3'), and at least one fifth plane (5) comprising at least one cockpit (5'), wherein said rotational plates are superimposed in an off-centered manner, wherein said first, second, and third rotational plates are non-coaxial with a rotational axis, said first rotational plate (1') having a larger diameter than said second rotational plate (2'), said second rotational plate (2') having a diameter equal to or larger than said third rotational plate (4"), wherein a center of said second rotational plate (2') is a point located over a radius of the underlying first rotational plate (1'), wherein a center of said third rotational rotational plate (4") is a point located over a radius of the underlying rotational plate (2') or over the circumference of the underlying rotational plate (2'), said track-like structure (3') being integrally joined above said second rotational plate (2') and being sized to enable the sliding of the overlying slidable base (4'), each of said first rotational plate (1'), second rotational plate (2'), and third rotational plate (4") being rotatable by 360° around the rotational axis both clockwise and counter-clockwise, wherein, in use, said motion simulation system subjecting a user in the at least one cockpit (5') to forces associated with lateral accelerations that occur when negotiating curves said method providing:

that steering and direction of entering a curve occurs by acting on rotation of the third rotational plate (4"), said third rotational plate (4") being arranged beneath the at least one cockpit of the user and being controllable using a vehicle steering system selected from among a steering wheel, a handlebar, a rudder, a gearshift, and a joystick, for subjecting, to action of a centrifugal force, elements of the motion simulation system arranged above the second rotational plate (2'), the second rotational plate (2') rotating around the axis thereof and underlying and supporting the track-like structure (3') to enable the sliding of the slidable platform (4'), said third rotational plate (4") integrally joined beneath the slidable platform (4'), the third rotational plate (4") supporting the at least one cockpit of the user, for boosting the action of said centrifugal force due to rotation of the first rotational plate (1') around the axis thereof, said rotation of the first rotational plate (1') occurring in a same direction as rotation of overlying second and third rotational plates.

\* \* \* \* \*